(No Model.)

L. PROSCH, Jr.
CAMERA SHUTTER.

No. 447,902. Patented Mar. 10, 1891.

WITNESSES
Will A. Courtland
Miles W. Brooks

INVENTOR
Louis Prosch Jr
by T. F. Bourne
his attorney.

UNITED STATES PATENT OFFICE.

LOUIS PROSCH, JR., OF BROOKLYN, NEW YORK.

CAMERA-SHUTTER.

SPECIFICATION forming part of Letters Patent No. 447,902, dated March 10, 1891.

Application filed August 20, 1890. Serial No. 362,493. (No model.)

*To all whom it may concern:*

Be it known that I, LOUIS PROSCH, Jr., residing in Brooklyn, Kings county, New York, have invented certain new and useful Improvements in Camera-Shutters, of which the following is a specification.

The object of my invention is to provide a photographic camera-shutter in which an instantaneous or time exposure can be made by a very simple adjustment.

Another object is to prevent the shutter from springing backward after it has turned to expose the plate.

The invention consists in the novel details of improvement and the combination of parts that will be more fully hereinafter set forth, and then pointed out in the claims.

Reference is to be had to the accompanying drawings, forming a part of this specification, wherein—

Figure 1:
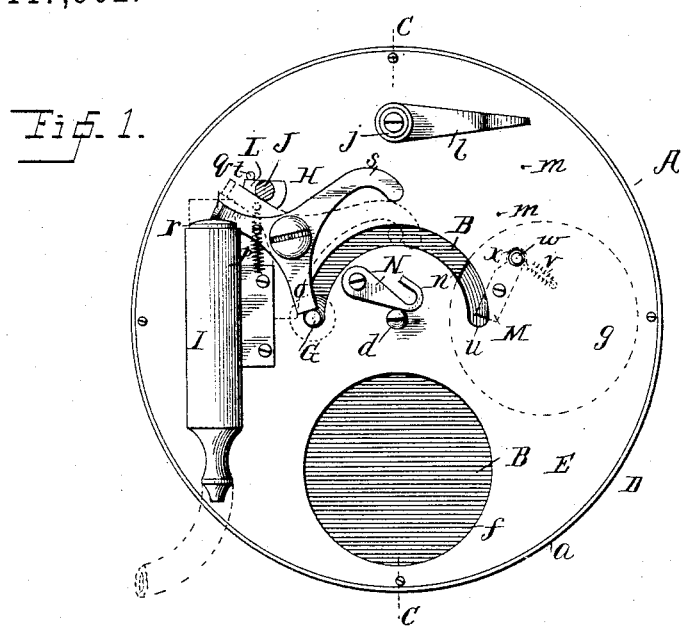
Figure 2:
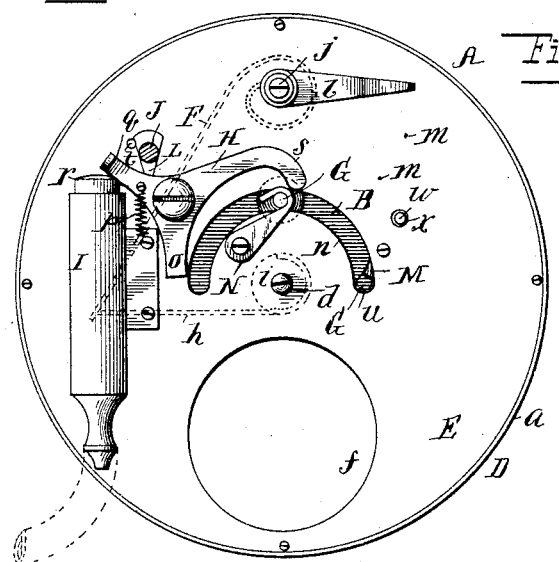
Figure 3:
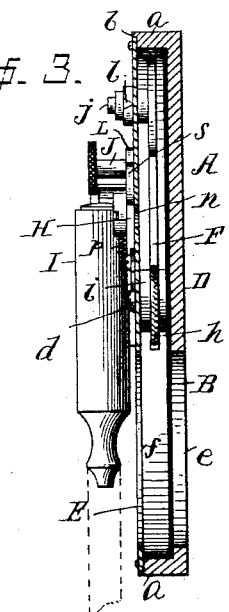

Figure 1 is a face view, partly in section, of a camera-shutter embodying my invention. Fig. 2 is a similar view thereof, the parts being in different position; and Fig. 3 is a vertical cross-section on the plane of the line $c\ c$, Fig. 1.

In the accompanying drawings, the letter A indicates a suitable casing, within which is placed the shutter B, as shown. The casing A is preferably composed of a disk or plate D, having a circumferential flange $a$, which on its outer side is recessed, as at $b$, and E is another disk or plate fitting on the flange $a$ and within the recess $b$, being held to the disk D by screws or the like. Within the space between the disks D and E is the shutter B and part of the mechanism. (See Fig. 3.) The casing A and shutter B are preferably circular, and the shutter B is journaled on an arbor or stud $d$. $e\ f$ are openings in the disks D and E, respectively, which register. The shutter B also has an opening $g$, (see dotted lines, Fig. 1,) through which light can pass when the openings $e\ f\ g$ register, as in Fig. 2.

To turn the shutter B quickly, I prefer to secure a cord $h$ to a hub or base $i$ on the shutter B, and also connect the cord $h$ to a spring F, which is secured to and, preferably at least, partly wound around a shaft $j$, journaled in the casing B. The shaft $j$ has secured to it an arm $l$, which extends over the outer side of the casing A, whereby when the arm $l$ is turned the spring F will be wound on the shaft $j$ more or less, and thereby the tension of the spring F can be regulated to increase or diminish its force to cause the shutter B to turn with more or less speed. The arm $l$ is held in the desired position by means of its outer bent end entering a recess $m$ in the disk E, there being any desired number of said recesses.

The movements of the shutter B are regulated as follows: G is a pin or projection carried by the shutter B, and it projects into or through a curved slot $n$ in one side of the casing A—say in the disk E—the curvature of said slot corresponding to the arc described by the pin G as it is carried around by the shutter B.

H is a three-armed lever hung on the casing A, two of its arms being adapted to pass into the path of the pin or projection G, as shown. The arm $o$ of the lever H passes near one end of the slot $n$, and it is normally held over said slot by a spring $p$, connected to said lever and to said casing or elsewhere. When the shutter is to be set, it is turned around to carry the opening $g$ to one side of the openings $e\ f$ and until the pin G is caught by the arm $o$. (See Fig. 1.) The arm $q$ of the lever H comes in line with the piston $r$ of an air-chamber I, carried by the casing A, which air-chamber is to be connected by a tube (shown in dotted lines) with an air-bell (not shown) in a manner well known, so that when the piston $r$ is actuated by pressing on the bulb the arm $o$ will be withdrawn from the pin G, and thus release the shutter. The arm $s$ of the lever H has one end curved or hooked, and it is adapted to pass over the path of the pin G at certain times to arrest the shutter. (See dotted lines, Fig. 1.)

To regulate and limit the movement of the lever H, I journal in the casing A a thumb button or stud J, which carries a projection L, against which an arm of the lever H is adapted to come. $t$ is a pin on the casing A to limit the movement of the stud J. When an instantaneous exposure is to be made, the thumb-stud J is turned so as to bring the projection L in line with the lever H, whereby the arm *s* is prevented from passing over the slot *n*, so that when the piston *r* is actuated the arm *o* will release the pin G, and thus the shutter B will swing round to expose the plate, the pin G then traveling from one end of the slot *n* to the other without interruption. It will be observed that the pin G and opening *g* are so arranged that when the pin G is at either end of the slot *n* the opening *g* will be out of line with the opening *e*, thus preventing light from passing to the plate. When a time exposure is to be made, the stud J is turned so as to carry the projection L away from the lever H to permit the latter to have further movement, so that when the piston *r* is pressed outwardly the arm *s* will pass across the slot *n*, and thus arrest the pin G, (see dotted line, Fig. 1,) thereby holding the opening *g* in line with the openings *e* and *f* the desired length of time. When the piston *r* recedes, (say by releasing the bulb,) the arm *s* will be withdrawn from the pin G, and the shutter will then be permitted to travel on to close the opening *e*.

To prevent the shutter B from swinging backward after it has been turned by the spring F, I provide a spring-stop M, that projects normally into the path of the pin G near the end *u* of the slot *n*. This stop is shown in the form of a lever that is pivoted on the disk E of the casing A, one of its ends being held normally in the path of the pin G or across the slot *n* by a spring V, Fig. 1. The stop or lever M also carries a pin or projection *w*, that presses through an opening X in the disk E, said opening being sufficiently large to permit the pin *w* to move enough to allow the end of the stop or lever M to be moved out of the path of the pin G. The pin *w* will project outwardly far enough to be conveniently operated by hand. When the pin G comes near the end *u* of the slot *n*, it will move the stop M to one side and then pass beyond it, as in dotted lines, Fig. 2, the pin G being thereby kept from moving backward. When the shutter B is to be set, the stop M is first moved to one side to give the pin G free passage through the slot *n*.

To hold the opening *g* in the shutter B temporarily in front of the openings *e f*—say for focusing—I journal a stop or hook N on the casing A in such position that it can be passed in the path of the pin G to hold the shutter B, as in Fig. 2. The stop or hook N is normally out of the path of the pin G, but can be conveniently moved to hold said pin when desired.

The casing A may be secured to the lens or elsewhere in any desired manner.

Of course, instead of using an air-chamber I and piston to actuate the lever H, said lever can be actuated by hand direct or by a cord or the like connected to it. Of course my improvements can be applied to any desired form of casing, they not being confined to the construction of casing shown.

Having now described my invention, what I claim is—

1. A rotary shutter carrying a pin or projection G, combined with an arm *o* to hold said pin in check when the shutter is set, another arm *s*, connected to the arm *o* and adapted to pass across the path of the pin G to arrest the shutter midway of its motion, a spring to move the arm *s* out of the path of the pin G, an arm *q*, connected with the arms *o* and *s*, a piston against which the arm *q* rests, and means, substantially as described, for moving said piston, said piston when moved outward acting to move the arm *s* across the path of the pin G, said arm being moved away from said pin by said spring when the piston recedes, substantially as described.

2. A rotary shutter carrying a pin or projection G, combined with an arm *o* to hold the pin G when the shutter is set, another arm *s*, connected with the arm *o* to pass across the path of said pin to arrest the shutter, a swiveled eccentric stud J to regulate the movement of the arm *s* to permit an instantaneous or time exposure to be made, and with means, substantially as described, for actuating the arms *o* and *s*, substantially as described.

3. A rotary shutter carrying a projection G, combined with the arms *o* and *s* to engage said projection to regulate the movement of said shutter, and with the swiveled stud J, carrying the projection L, to regulate the movement of the arm *s*, and with means, substantially as described, for actuating the arms *o* and *s*, as specified.

4. A rotary shutter carrying a projection G, combined with a three-armed lever H, two of whose arms are adapted to engage said projection G at different times to hold the shutter in different positions, the remaining arm being connected with devices for operating said lever, and with a swiveled eccentric stud to regulate the amount of movement of said lever to allow an instantaneous or time exposure to be made, substantially as described.

5. A casing having an aperture and a curved slot *n*, combined with a rotary shutter carrying a projection G, that passes through said slot, and an opening *g* in the shutter to register with the opening in the casing, combined with a stop or hook N, pivoted on the casing and adapted to pass across said slot *n* to engage said projection to hold the openings in the casing and shutter in line, substantially as described.

6. A rotary shutter provided with a pin or projection G and a spring to turn said shutter, combined with a pivoted lever M, one end of which projects in the path of said projection G to prevent a rebound of the shutter from the tension of said spring, a stop to limit the movement of said lever, and a spring to hold said lever in its normal position, substantially as described.

7. A casing having an aperture X, a shutter carried by said casing and having a projection G, combined with a stop-lever M, one end of which is normally held in the path of the projection G, a pin on said lever and projecting through the aperture X, and a spring connected to said lever to hold it in its normal position, the end walls of the aperture X limiting the movement of the pin, substantially as described.

LOUIS PROSCH, JR.

Witnesses:
T. F. BOURNE,
THEODORE BOURNE.